United States Patent
Guo et al.

(10) Patent No.: US 12,284,719 B2
(45) Date of Patent: Apr. 22, 2025

(54) REVOCATION AND MODIFICATION OF USER CONSENT

(71) Applicant: Apple Inc., Cupertino, CA (US)

(72) Inventors: Shu Guo, Beijing (CN); Dawei Zhang, Saratoga, CA (US); Huarui Liang, Beijing (CN); Haijing Hu, Beijing (CN)

(73) Assignee: Apple Inc., Cupertino, CA (US)

( * ) Notice: Subject to any disclaimer, the term of this patent is extended or adjusted under 35 U.S.C. 154(b) by 668 days.

(21) Appl. No.: 17/439,224

(22) PCT Filed: May 10, 2021

(86) PCT No.: PCT/CN2021/092550
§ 371 (c)(1),
(2) Date: Sep. 14, 2021

(87) PCT Pub. No.: WO2022/236520
PCT Pub. Date: Nov. 17, 2022

(65) Prior Publication Data
US 2023/0209329 A1    Jun. 29, 2023

(51) Int. Cl.
*H04W 8/18* (2009.01)

(52) U.S. Cl.
CPC ..................... *H04W 8/18* (2013.01)

(58) Field of Classification Search
CPC ......... H04W 8/18; H04W 60/04; H04W 4/20; H04W 48/02; H04W 60/005; H04W 88/06; H04W 4/50; H04L 65/1016
See application file for complete search history.

(56) References Cited

U.S. PATENT DOCUMENTS

2013/0281063 A1* 10/2013 Jactat .................... H04W 24/10
                                                         455/411
2019/0026450 A1*  1/2019 Egner .................... G06F 21/44
(Continued)

FOREIGN PATENT DOCUMENTS

CN     112752253 A     5/2021
WO     2012138083    10/2012
(Continued)

OTHER PUBLICATIONS

Extended European Search Report for EP 21887864.3; 12 pages; Sep. 27, 2022.
(Continued)

*Primary Examiner* — Kabir A Timory
(74) *Attorney, Agent, or Firm* — Kowert, Hood, Munyon, Rankin & Goetzel, P.C.

(57) ABSTRACT

Apparatuses, systems, and methods for revocation and/or modification of user consent in Edge Computing (MEC). A user equipment device (UE) may determine that user consent needs to be updated. The user consent may be associated with MEC. Additionally, the UE may transmit, via an application layer of the UE, a user consent modification request to an edge application server of a network, e.g., of an edge data network. The user consent modification request may be carried in application data traffic. The user consent modification request may be indicated via an Nnef_ParameterProvision_Update service operation. The user consent modification request is indicated via an Nnef_ParameterProvision_Update service operation.

20 Claims, 15 Drawing Sheets

(56) References Cited

U.S. PATENT DOCUMENTS

2019/0274082 A1* 9/2019 Vemuri .......... H04W 36/008375
2020/0359218 A1* 11/2020 Lee ....................... H04M 15/50
2021/0007166 A1 1/2021 Liao et al.
2021/0157949 A1 5/2021 Landry

FOREIGN PATENT DOCUMENTS

WO   2020256366 A1   12/2020
WO   2021086157 A1   5/2021

OTHER PUBLICATIONS

Samsung "User consent for exposure of information to Edge Applications"; 3GPP TSG-SA3 Meting #101-e S3-203247; 3 pages; Nov. 9, 2020.
China Telecom et al. "Solution update for Solution#3: User consent for UE data collection"; 3GPP SA WG2 Meeting #140e S2-2006273; 3 pages; Sep. 19, 2020.
International Search Report and Written Opinion for PCT/CN2021/092550; 9 pages; Feb. 11, 2022.
Apple et al. "KI #2 New Sol: Edge Relocation triggered by a central AF;" 3GPP SA WG2 Meeting #139E; Elbonia; 4 pages; S2-2003737; 4 pages; Jun. 1-12, 2020.

* cited by examiner

REVOCATION AND MODIFICATION OF USER CONSENT

PRIORITY CLAIM INFORMATION

This application is a national stage application of International Application No. PCT/CN2021/092550, filed on May 10, 2021, titled "Revocation and Modification of User Consent", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for revocation and/or modification of user consent in Edge Computing (MEC), e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for revocation and/or modification of user consent in Edge Computing (MEC), e.g., in 5G NR systems and beyond.

For example, in some embodiments, a user equipment device (UE), such as UE 106, may be configured to determine that user consent needs to be updated. The determination may be based on various factors, such as an indicated change in user preference, a periodic update of user preference, and/or various other factors. The user consent may be associated with Edge Computing (MEC). Additionally, the UE may be configured to transmit, via an application layer of the UE, a user consent modification request to an edge application server of a network, e.g., of an edge data network. The user consent modification request may be carried in application data traffic. In some embodiments, the user consent modification request may be indicated via an Nnef_ParameterProvision_Update service operation. In some embodiments, the user consent modification request is indicated via an Nnef_ParameterProvision_Update service operation.

As another example, an edge application server (EAS), such as EAS 834, may be configured to receive, from a UE, a user consent modification request. The user consent modification request may be associated with MEC. The user consent modification request may be carried in application data traffic. Additionally, the EAS may be configured to deliver (e.g., send and/or transmit), to an edge enabler server (EES), the user consent modification request. The user consent modification request may be indicated via an Nnef_ParameterProvision_Update service operation.

As a further example, an edge enabler server (EES), such as EES 844, may be configured to receive, from an EAS, a user consent modification request for a UE. The user consent may be associated with MEC. Additionally, the EES may be configured to notify a home public land mobile network (HPLMN) associated with the UE of a user consent modification.

As a further example, a network entity, such as an AMF of a network, may be configured to receive, from a PCF of the network, a request to update a user consent status. The AMF may be configured to transfer, to a UE the request to update the user consent status. Further, the AMF may be configured to receive, from the UE, an updated user consent status and forward, to the PCF, the updated user consent status.

As yet a further example, a network entity, such as an SMF of a network, may be configured to trigger (e.g., initiate) an EAS relocation and may receive, from an AF of the network, a user consent modification request. Additionally, the SMF may be configured to execute (e.g., perform) a PDU session modification procedure to update user consent. As another example, a network entity, such as SMF of a network, may be configured to may receive, from an AMF of the network, a user consent update request via a PDU update message. Additionally, the SMF may be configured to send, to the AMF, a PDU response that may include a user consent update acknowledge and receive, from the AMF, a user consent update. The PDU response may be a Nsmf_PDUSession_UpdateSMContext response.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
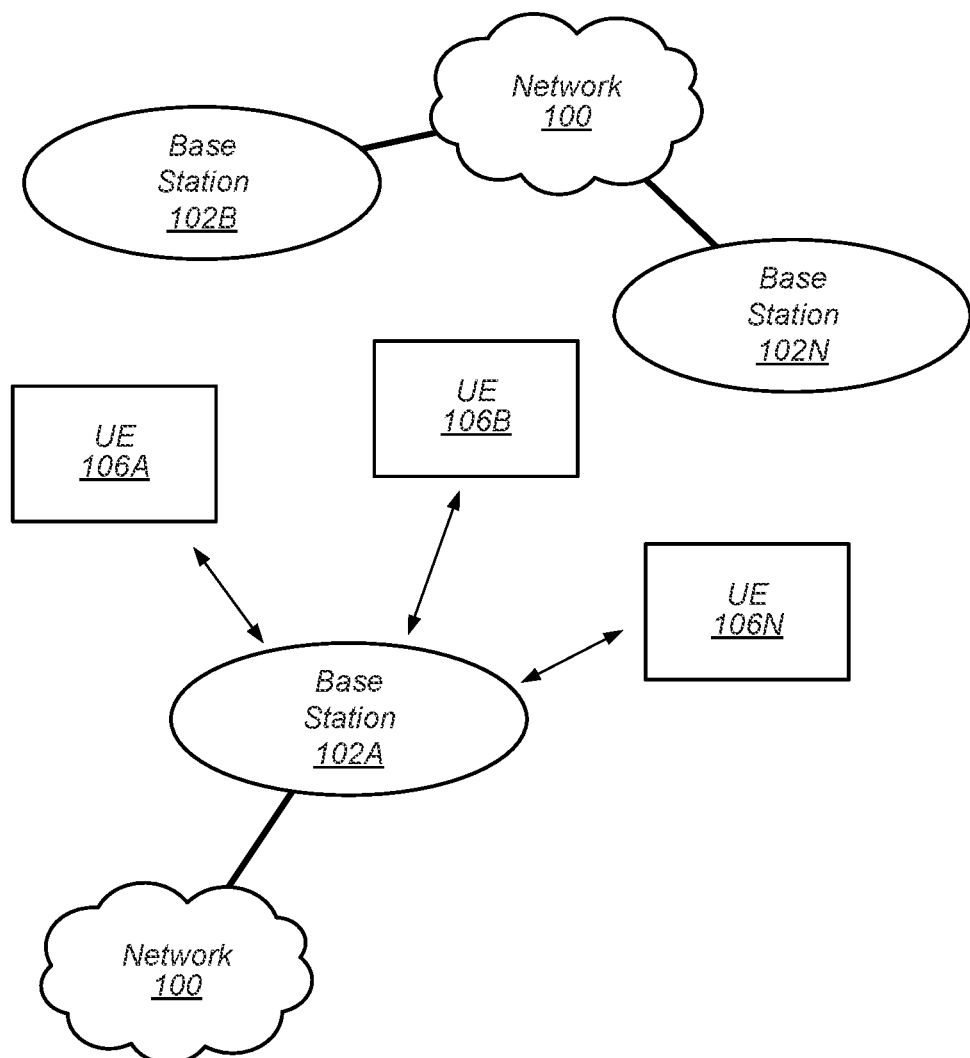
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Edge Computing (MEC)—refers to infrastructures that allow for implementation of software-only mobile functions or Software-as-a-Service (SaaS) applications that operate entirely within a standardized virtualization platform which is deployed in or close to a network edge. The MEC architecture may include two functional areas—host and management—with the management layer including both host and system-level administrative entities.

Network Exposure Function (NEF)—refers to a function that provides mechanisms to securely expose services and capabilities provided by 3GPP network functions.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
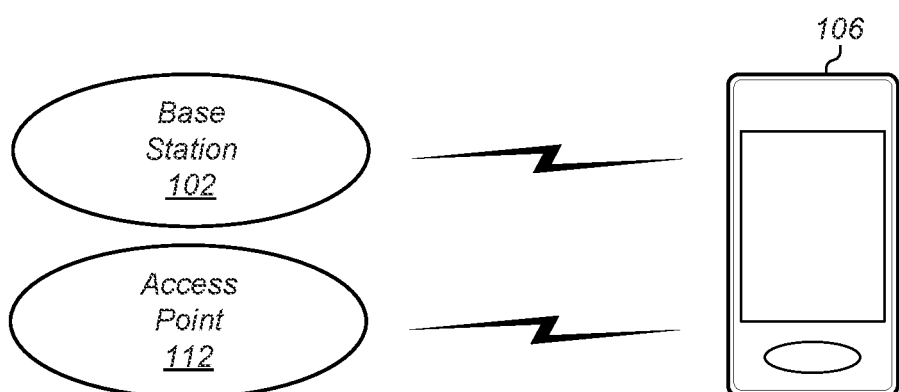
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
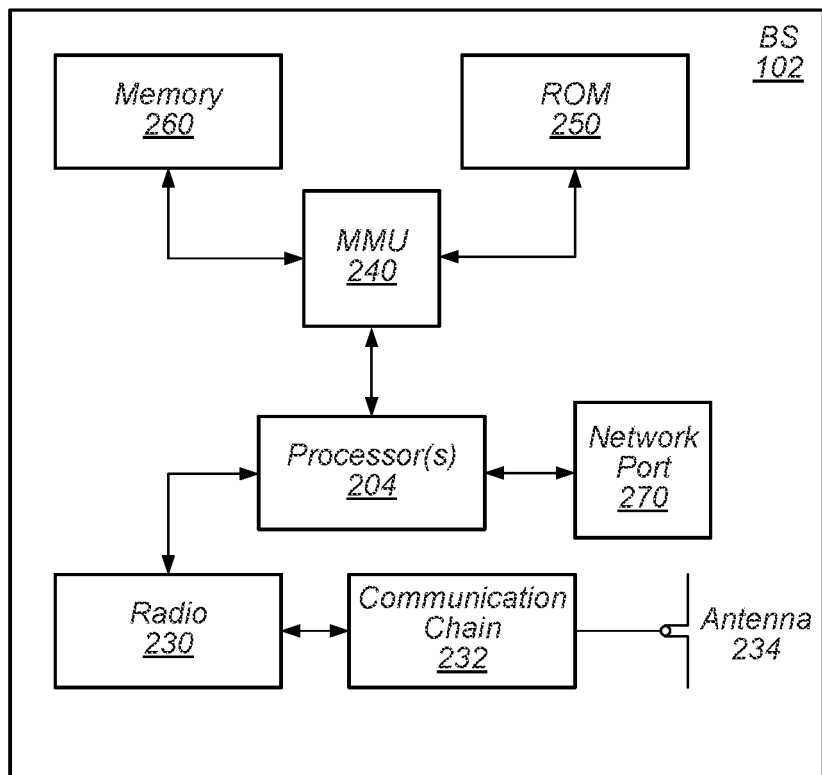
FIG. 2 illustrates an example block diagram of a base station, according to some embodiments.

FIG. 2: Block Diagram of a Base Station

Figure 3:
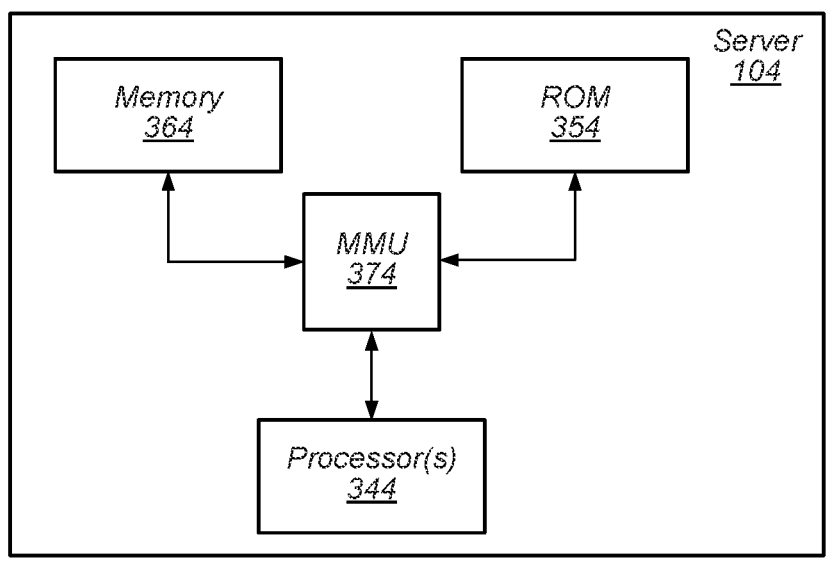
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
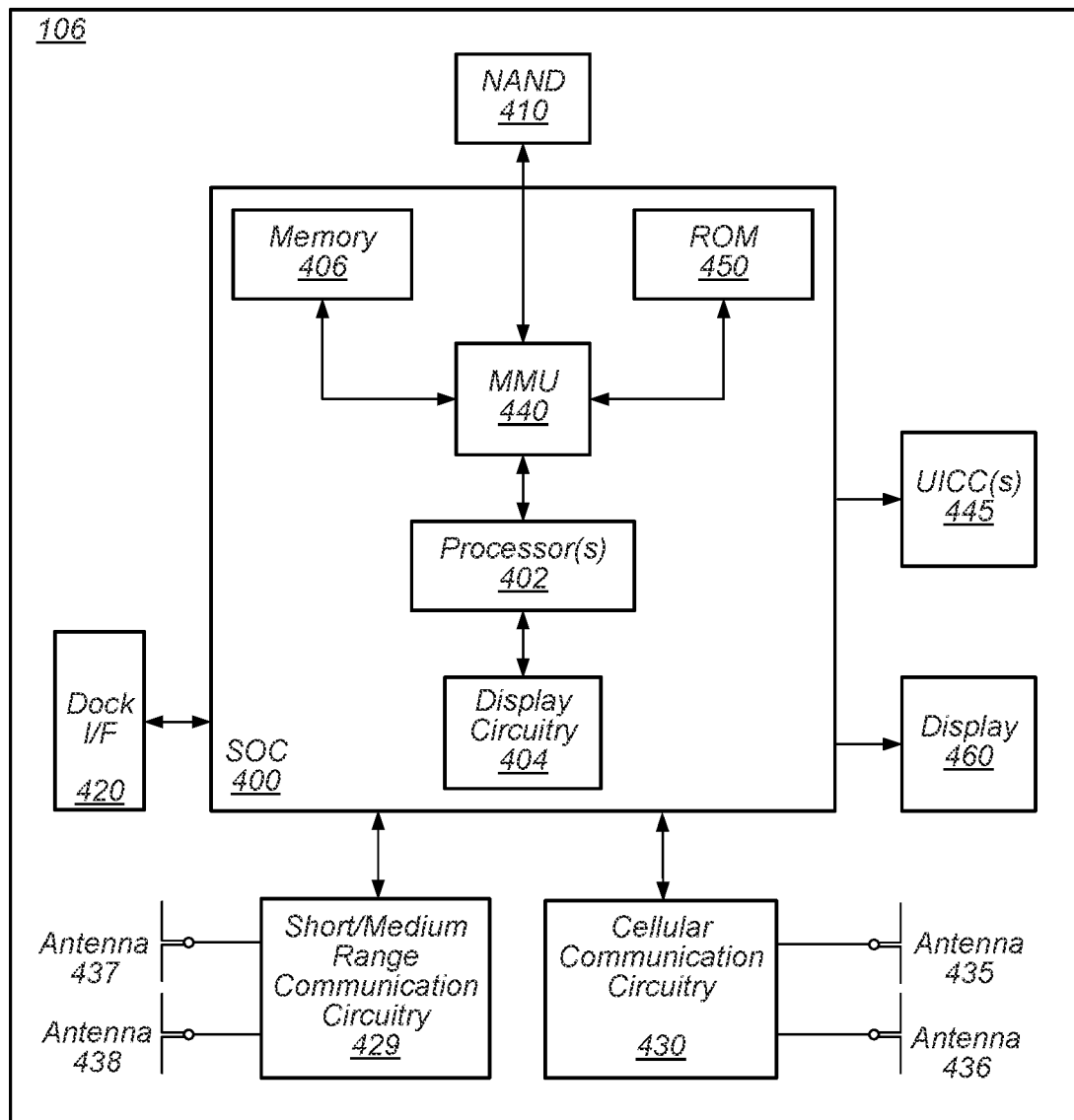
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for revocation and/or modification of user consent in MEC, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
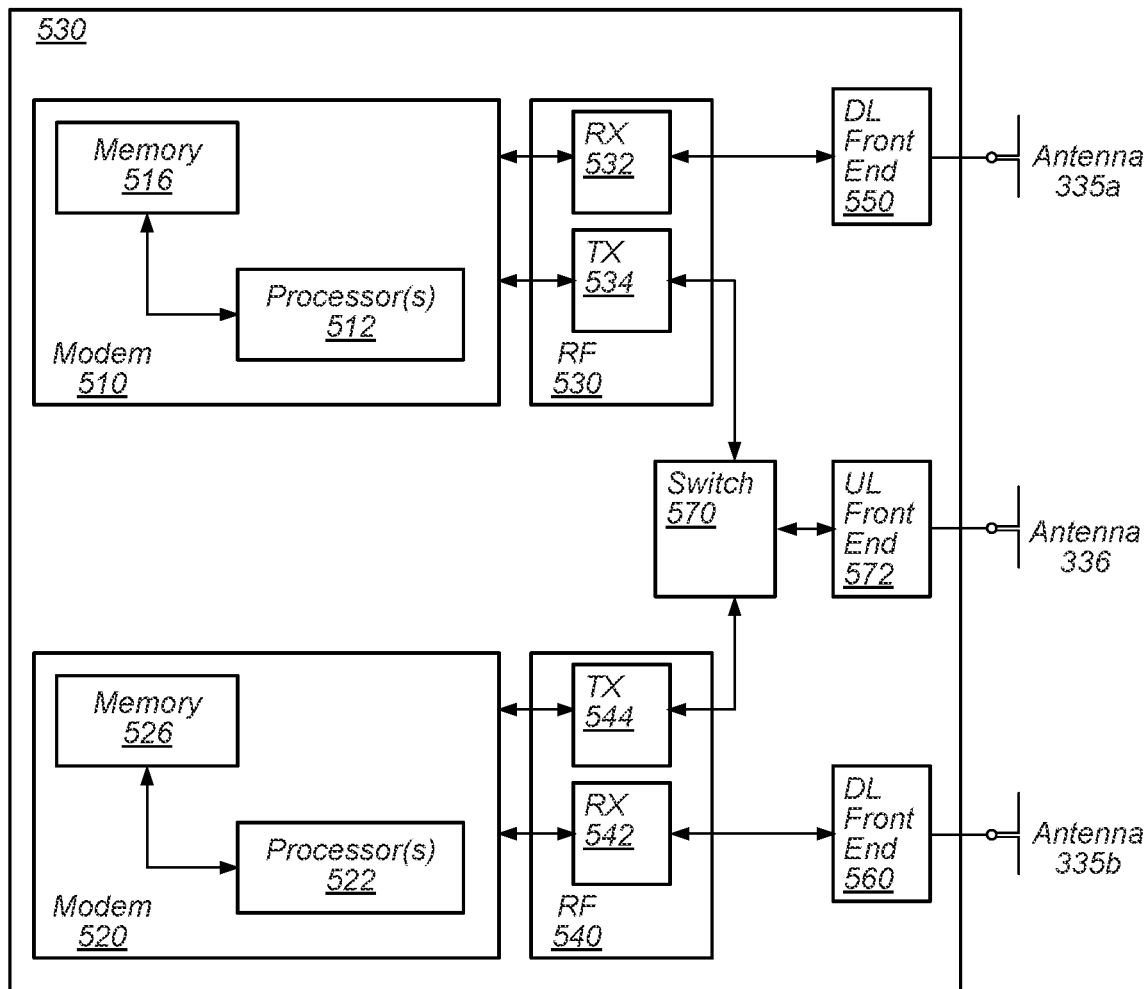
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435a-b and 436 as shown (in FIG. 4). In some embodiments, cellular communication circuitry 530 may include dedicated receive chains (including and/or coupled to, e.g., communicatively; directly or indirectly dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for revocation and/or modification of user consent in MEC, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
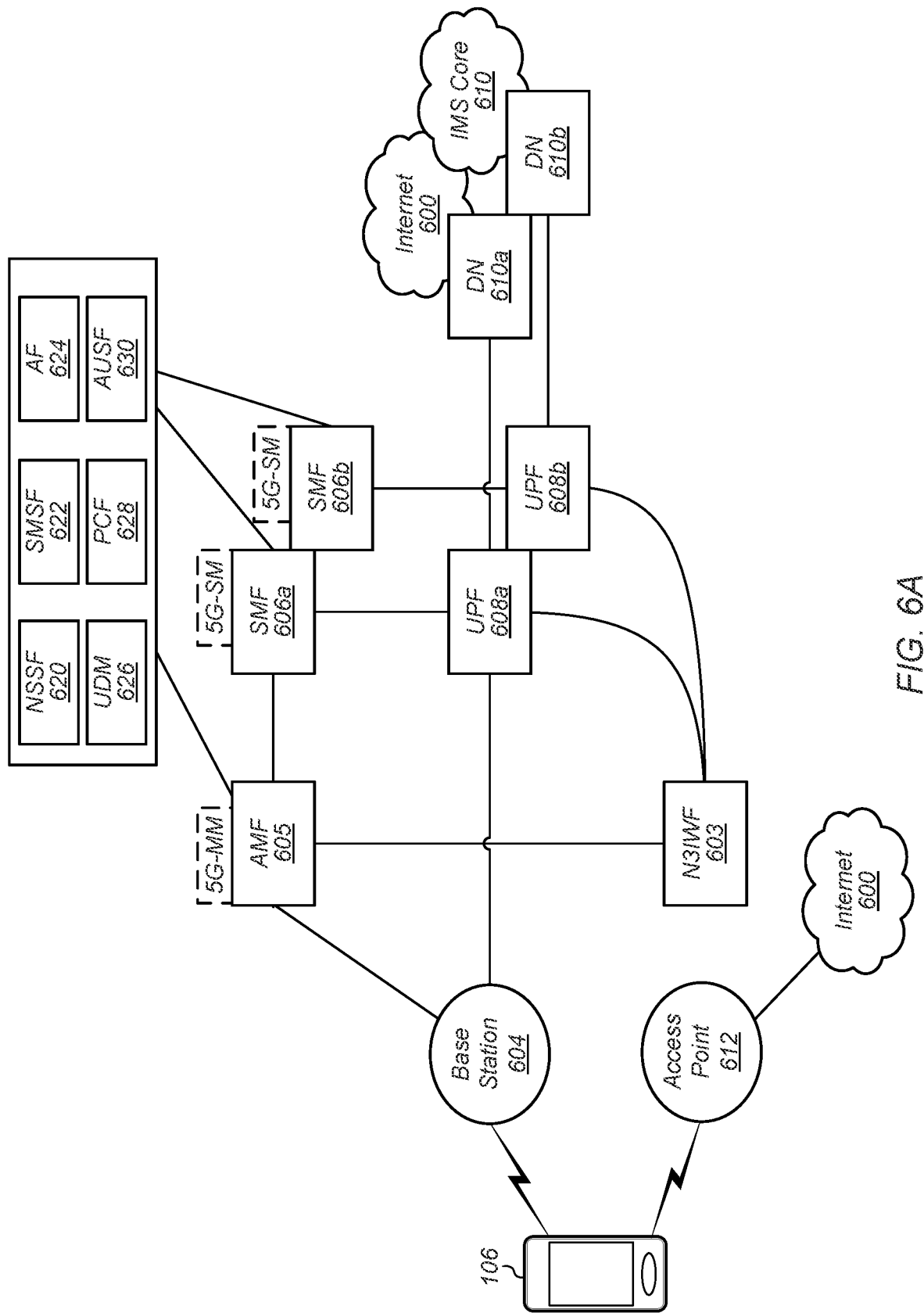
FIG. 6A illustrates an example of a 5G network architecture that incorporates both 3GPP (e.g., cellular) and non-3GPP (e.g., non-cellular) access to the 5G CN, according to some embodiments.
Figure 6B:
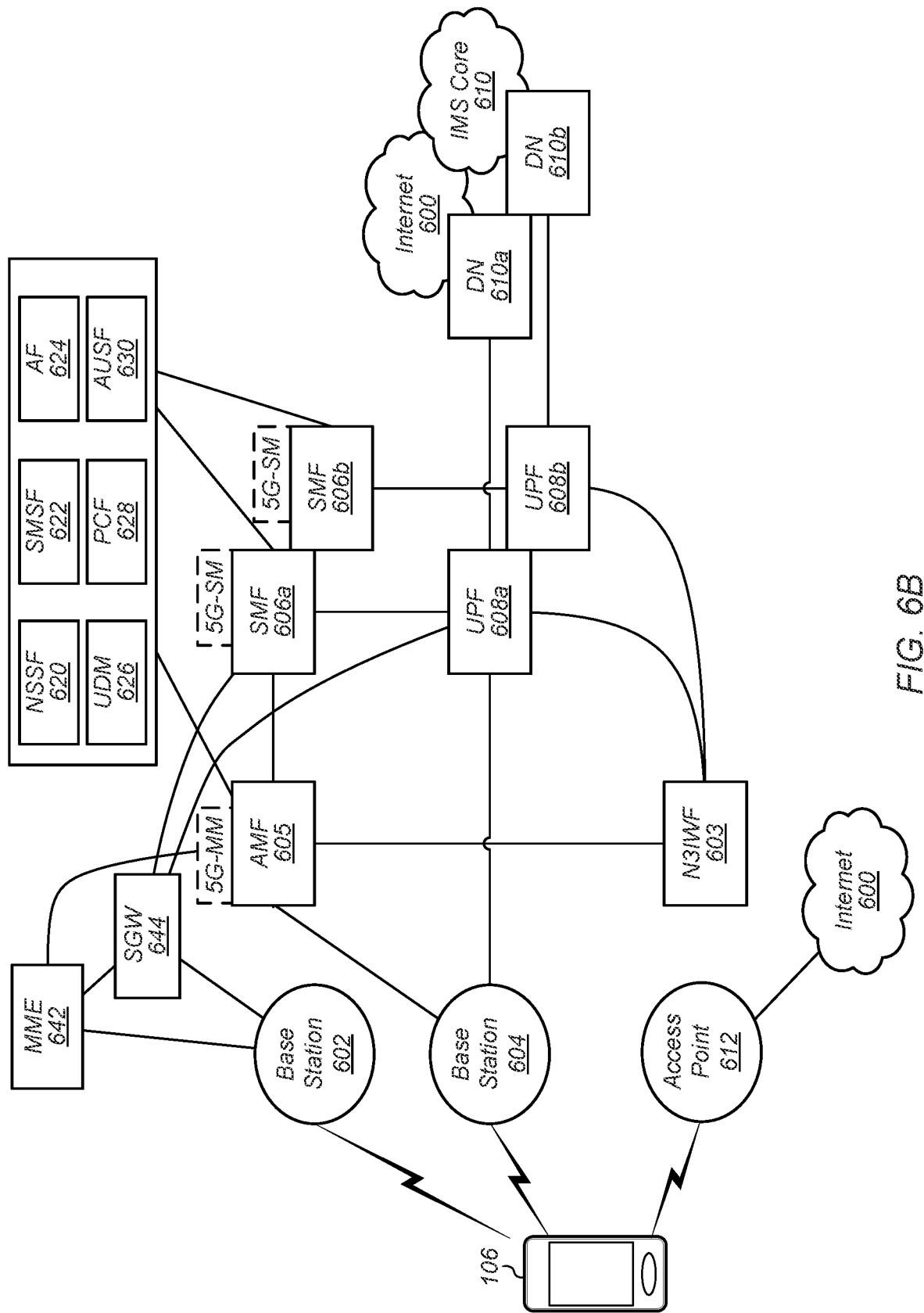
FIG. 6B illustrates an example of a 5G network architecture that incorporates both dual 3GPP (e.g., LTE and 5G NR) access and non-3GPP access to the 5G CN, according to some embodiments.
Figure 7:
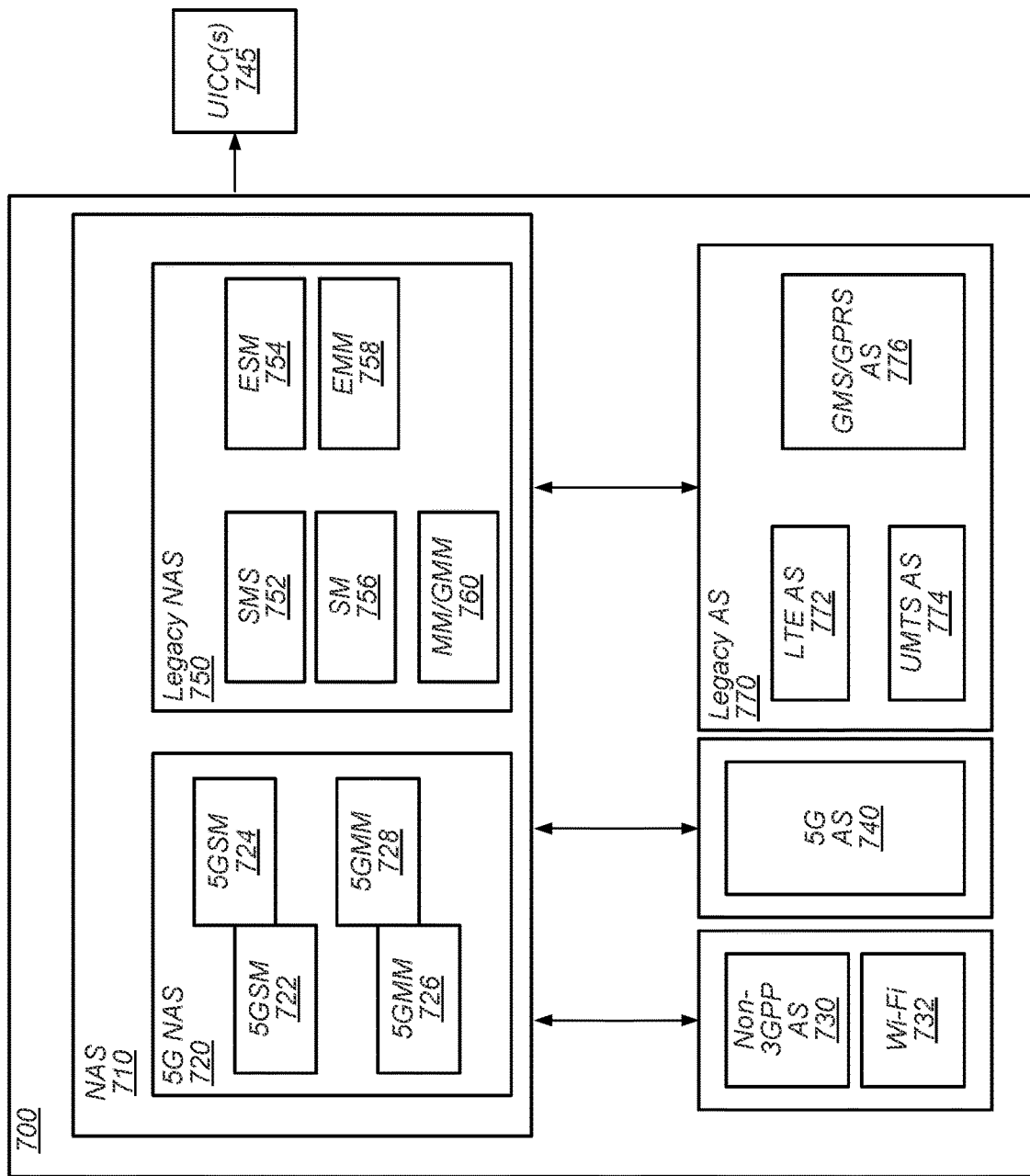
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 605 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods to improve security checks in a 5G NR network, including mechanisms for revocation and/or modification of user consent in MEC, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for revocation and/or modification of user consent in MEC, e.g., in 5G NR systems and beyond, e.g., as further described herein.

Revocation/Modification of User Consent

In current implementations, e.g., as defined by TR 33.867 V4.0, a 5G system (5GS) is required to specify mechanisms to allow a user to change and/or add consent for a service.

User consent may be collected at the beginning of a service, for example, in Edge Computing (MEC), an Edge Application Server (EAS) may require user consent when the UE registers the service. Thus, the user may confirm the consent in the beginning, however, at some point during the service, the user may change their consent from agreeing to share user sensitive information (e.g., such as UE location) to not agreeing to not share user sensitive information. Hence, it may be necessary to provide a procedure for a UE to modify and/or revoke user consent.

Embodiments described herein provide systems, methods, and mechanisms to support revocation and/or modification of user consent in MEC, including systems, methods, and mechanisms for modification/revocation of user consent through a Network Exposure Function (NEF), periodic updates of user consent, and UE initiated modification of user consent. In some embodiments, user consent may be collected in an application layer and/or 3GPP layer of a UE, such as UE 106. For example, when user consent is collected in the application layer of the UE, modification/revocation may also be sent through the application layer. Thus, to update a state of the user consent in the Mobile Network Operator (MNO) network, the application server may send a notification to the MNO domain (e.g., such a unified data management (UDM) server and/or other network entities) through interfaces with the NEF. Note that how the application server gets the new state of user consent may be left to specific UE implementation. As another example, when user consent is collected in the 3GPP layer of a UE, modification/revocation may also be sent through the 3GPP layer.

Figure 8:
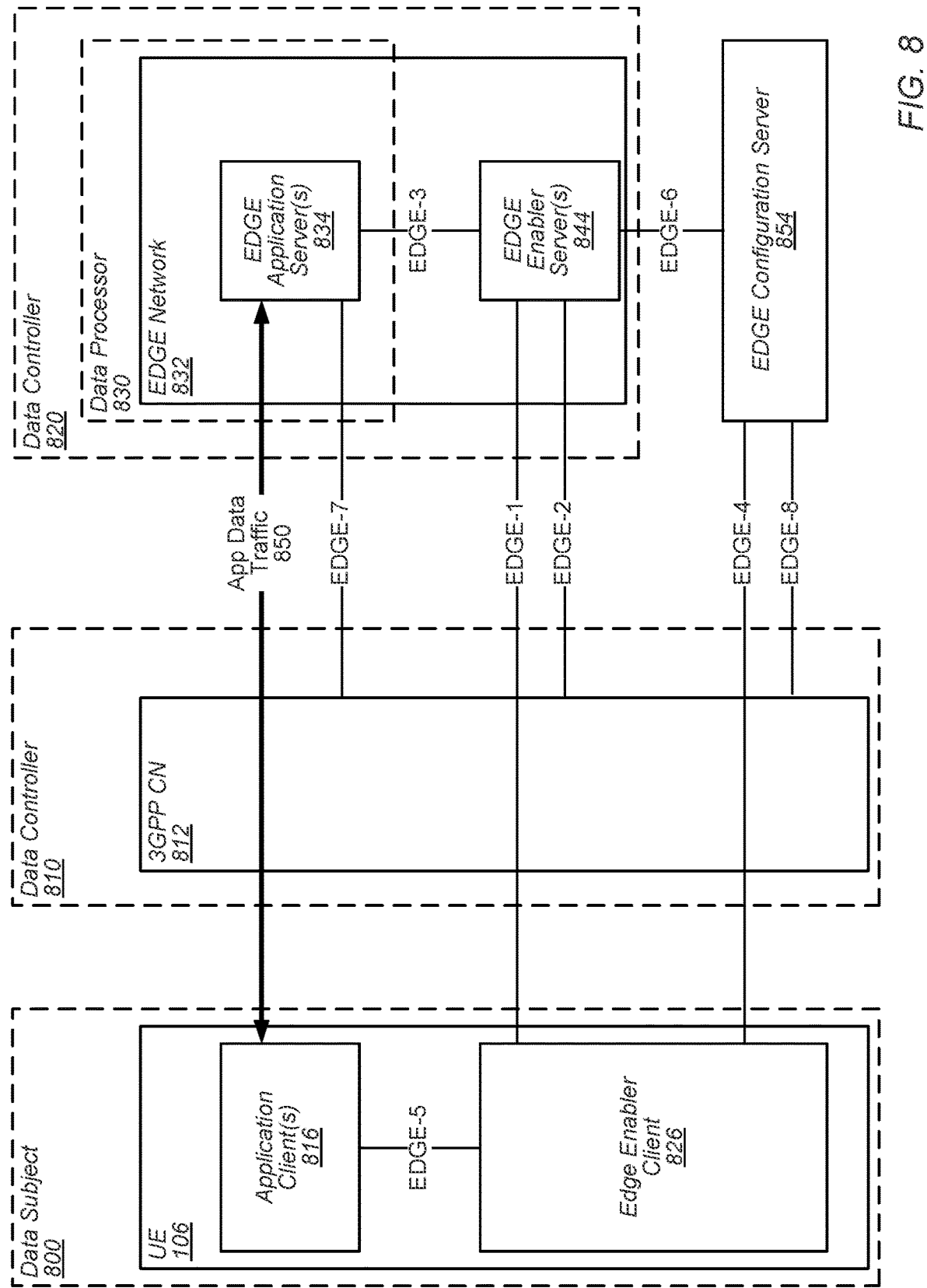
FIG. 8 illustrates an example of updating user consent in an EDGE network, according to some embodiments.

As an example, a UE, such as UE 106, may send a user consent modification/revocation request to an application server through an application layer of the UE. Then, the application server may send an update to the user consent to an MNO network through interfaces with a NEF. For example, as illustrated by FIG. 8, an edge enabler server (EES) 844 of an edge data network 832 may cater to edge applications running at the edge data network, e.g., running on edge application server(s) 834 via an EDGE-3 interface. The EES 844 may be configured to expose application program interfaces (APIs) (e.g., such as a location service and/or a UE identifier (e.g., Generic Public Subscription Identifier (GPSI)), among other APIs) to the EAS 834. In addition, public land mobile network (PLMN) network functions (NFs) may also be configured to expose the APIs to the EES 844. Thus, if the EAS 834 requests user consent for use of sensitive information from the PLMN (e.g., such as 3GPP CN 812, for a service, e.g., such as location, GPSI, and so forth, and the service is provided to the UE 106, user consent may be collected from the user. Then, when the UE 106 (e.g., user) needs to modify and/or revoke user consent, the UE 106 may send a user consent modification request through the application data traffic 850 to the EAS 834, e.g., an application client 816 executing on UE 106 may send the user consent modification request through the application data traffic 850 to the EAS 834. The EAS 834 may then deliver the user consent modification request (which may, e.g., modify and/or revoke a previously provided user consent) to the EES 844, e.g., via the EDGE-3 interface. Further, the EES 844 may deliver the user consent modification request to an Evolved Charging Suite (ECS) executing on an edge configuration server, such as edge configuration server 854, via an EDGE-6 interface and to a home PLMN (HPLMN) (e.g., 3GPP CN 812) of the UE 106 via an EDGE-2 interface. In addition, EES 844 may interface with the edge enabler client 826 via an EDGE-1 interface. Additionally, edge configuration server 854 may interface with the home PLMN via an EDGE-8 interface and with the edge enabler client 826 via an EDGE-4 interface. Note that the EES 844 may also maintain interfaces with the HPLMN, e.g., via an EDGE-2 interface and an EDGE enabler client 826 executing on the UE 106 via an EDGE-1 interface. Note further that the edge enabler client 826 may interface with the application client 816 via an EDGE-5 interface. Additionally, the UE 106 may be considered a data subject 800 wherein as the HPLMN (e.g., 3GPP CN 812) may be considered part of a data controller 810. Further, EDGE network 832 and EES 844 may be considered part of a data controller 820 that may include data processor 830, as shown.

Note that the above mechanism may be applied to MEC as well as other use cases. Note that EDGE-3 and EDGE-6 are in the EDGE network 832 whereas EDGE-2 is outside of the EDGE network 832. Thus, for EDGE-2, an Nnef_ParameterProvision_Update service operation (e.g., per 3GPP TS 23.502 section 5.2.6.4.2) may be used for user consent modification request transmission. For example, in some embodiments, the Nnef_ParameterProvision_Update may be modified to include a user consent update, e.g., in addition to including other UE related information such as expected UE behavior, network configuration parameters, location privacy indication parameters, and so forth.

In some embodiments, a network (e.g., a network entity) may trigger a user consent update procedure. For example, a policy control function (PCF) may initiate a UE configuration update to trigger the user consent update procedure. The UE configuration update procedure may be used to provision UE route selection policy (URSP) rules, which may be used for the UE to establish an appropriate protocol data unit (PDU) session prior to edge access stratum (AS) discovery. Thus, the UE configuration update procedure may be (re)used to deliver the user consent update request from the core network (e.g., from the PCF).

Figure 9:
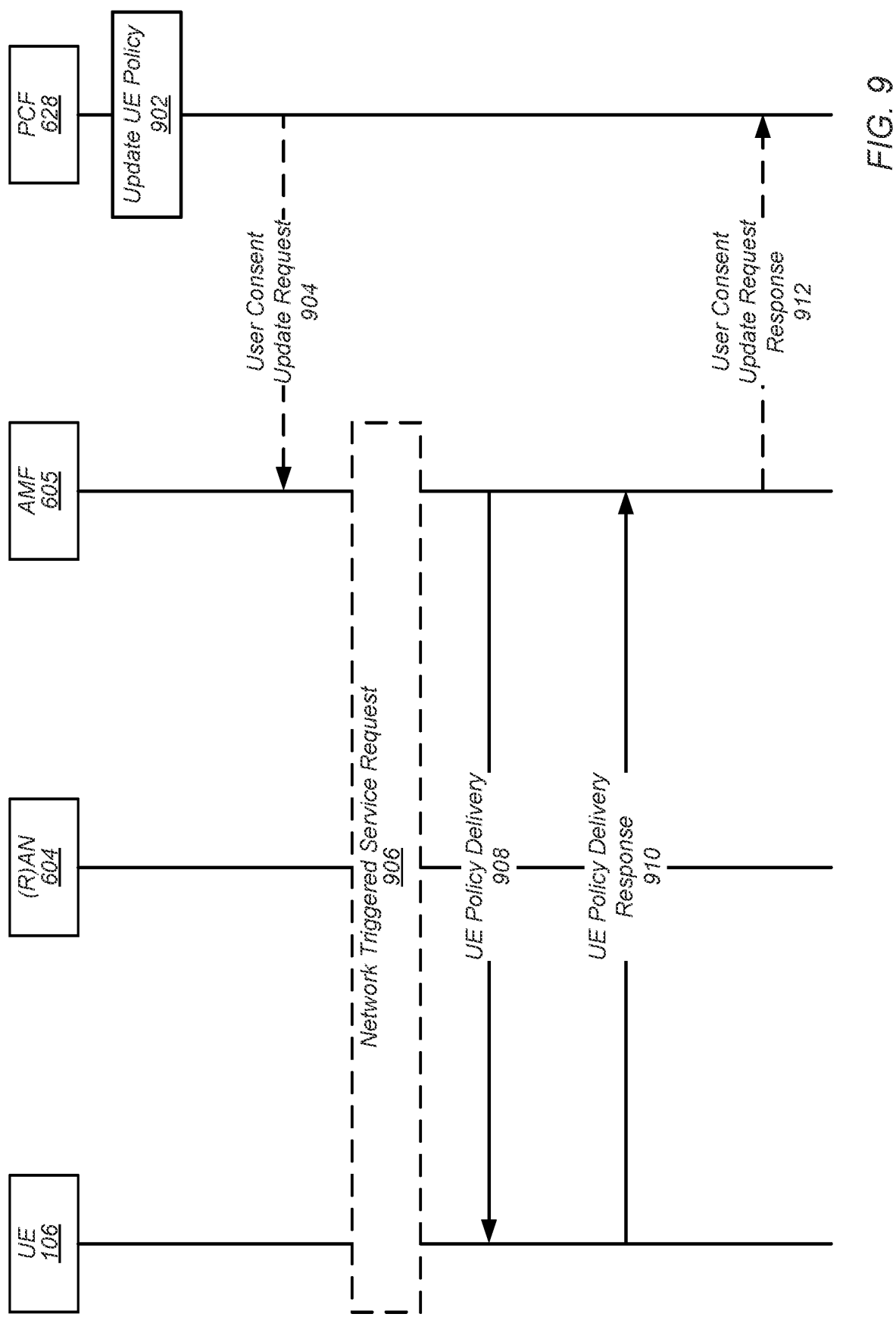
FIG. 9 illustrates an example of signaling for a PCF to initiate a UE configuration update to trigger a user consent update procedure, according to some embodiments.

For example, FIG. 9 illustrates an example of signaling for a PCF to initiate a UE configuration update to trigger a user consent update procedure, according to some embodiments. The signaling shown in FIG. 9 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 902, a PCF, such as PCF 628 may determine to update UE policies and/or update a user consent status based on triggering conditions, e.g., UE policies and/or user consent status of a UE, such as UE 106. The triggering conditions may include an initial registration, registration with a 5G system (5GS) when the UE 106 moves from an evolved packet system (EPS) to 5GS, and/or a need for updating UE policy.

In response to the triggering condition, the PCF may send a user consent update request message 904 to an AMF, such as AMF 605. In some instances, the user consent update request message 904 may invoke a Namf_Communication_N1N2MessageTransfer service operation provided by the AMF. The user consent update request message 904 message may include a Subscription Permanent Identifier (SUPI), a UE Policy Container and/or a user consent update request. Note that whether the user consent update request is for one specific service (e.g., such as MEC) or for all the sensitive information collection, may be indicated in the user consent update request message 904.

At 906, the AMF may transfer (transparently) the UE Policy container and/or user consent update request received in the user consent update request message 904 to the UE via a network triggered service request.

Additionally and/or alternatively, if and/or when the UE is in a CM-CONNECTED over 3GPP access and/or non-3GPP access, the AMF may transfer transparently the UE Policy container (e.g., including UE access selection and/or PDU Session selection related policy information) received from the PCF and/or the user consent update request received form the PCF to the UE via UE policy delivery message 908.

Then, the UE may update the UE policy provided by the PCF and may send the user consent update to the AMF via UE policy delivery response message 910.

The AMF may then forward the response of the UE (including the user consent update) to the PCF via user consent update request response message 912. In some embodiments, the AMF may forward the response of the UE (including the user consent update) to the PCF via a using Namf_Communication_N1MessageNotify service.

As another example an SMF of the network may initiate a PDU session modification to trigger the user consent update procedure. The PDU session modification procedure (e.g., as defined in section 4.3.3.2 of 3GPP TS 23.502) is used for the SMF to indicate the EAS rediscovery to the UE based on information provided by AF or based on SMF's local configuration. However, since the UE will initiate a new PDU session establishment procedure after this PDU session modification procedure, this procedure may be leveraged to allow for a user consent update. In some embodiments, the user consent request may be included in (e.g., carried in) an Nsmf_PDUSession_UpdateSMContext Response in the PDU session modification procedure. In some embodiments, the user consent update procedure may be initiated by the core network or the application server periodically. The period may be configurable. Alternatively, and/or in addition, the user consent update procedure may be initiated by the network on demand, e.g., event and/or trigger based.

Figure 10:
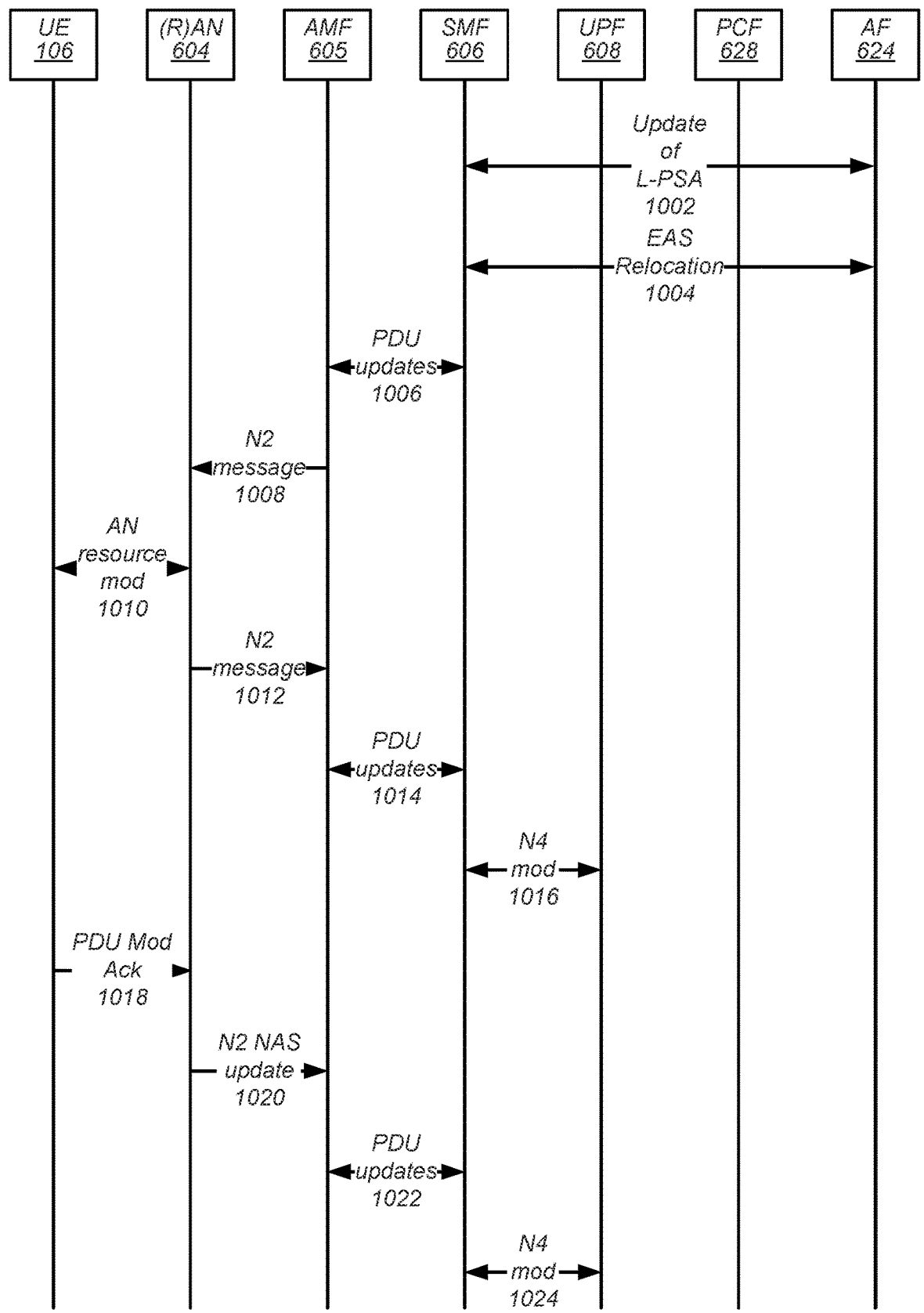
FIG. 10 illustrates an example of signaling for an SMF to initiate a UE configuration update to trigger a user consent update procedure, according to some embodiments.

For example, FIG. 10 illustrates an example of signaling for an SMF to initiate a UE configuration update to trigger a user consent update procedure, according to some embodiments. The signaling shown in FIG. 10 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1002, due to UE mobility (e.g., mobility of UE 106), an SMF, such as SMF 606, may trigger an L-PSA insertion, change and/or removal for a PDU Session.

At 1004, a user plane management event notifying an AF, such as AF 624, may trigger EAS relocation. Note that if and/or when the AF triggers the EAS. Additionally, relocation and/or UE related update, e.g., due to EAS load balance or maintenance, the UE may trigger user consent modification/revocation through an application layer. Additionally, the UE may inform the SMF of related information. Then, the SMF may execute a network requested PDU Session Modification procedure as defined in clause 4.3.3.2 of 3GPP TS 23.502 and further described below in reference to signaling 1006-1024. Note that the signaling described below may include modifications to the PDU Session Modification procedure as defined in clause 4.3.3.2 of 3GPP TS 23.502. In some instances, the SMF may make the decision to indicate the EAS rediscovery to the UE based on information provided by the AF and/or based on SMF's local configuration. Thus, the SMF may send a PDU Session Modification Command (EAS rediscovery indication, [impact field], user consent update request) to UE. In some embodiments, the impact field may be used to identify which EAS(s) needs to be rediscovered. Thus, if and/or when the impact field is not included may indicate that all EAS(s) associated with this PDU Session need to be rediscovered. Note that if and/or when the EAS rediscovery is only for user consent update, then the "EAS rediscovery indication" and "impact field" may be the same and/or set as a fixed value (e.g., 0.). Additionally, if and/or when the EAS rediscovery is only for regular discovery, the "user consent update request" field may be set as null. In addition, note that the user consent update request may be carried together with the EAS relocation, e.g., whenever the EAS relocation takes place, the user consent update request may be sent. The user consent update request may also be sent according to the mobile network operator (MNO) policy, at least in some embodiments.

Continuing with the signaling of FIG. 10, at 1006, the SMF may perform PDU update messaging with an AMF, such as AMF 605. For example, for an SMF requested modification, the SMF may invoke a Namf_Communication_N1N2MessageTransfer service. The SMF may send various information to the AMF as part of the service, e.g., as currently defined by clause 4.3.3.2 of 3GPP TS 23.502. In addition, as part of the service, the SMF may send a user consent update request to the AMF.

The AMF may then send an N2 message 1008 to a radio access network (RAN), such as (R)AN 604, which may include sending the N2 message to a base station, such as base station 604. The message may include the user consent update request as well as information as defined by clause 4.3.3.2 of 3GPP TS 23.502.

At 1010, the RAN may issue an access network (AN) specific signaling exchange with the UE that is related with the information received from SMF. For example, RRC Connection Reconfiguration may take place. Additionally, the UE may update user consent.

Additionally, the RAN may send an N2 reply message 1012 to the AMF, which may include various information as defined by clause 4.3.3.2 of 3GPP TS 23.502. The N2 reply message may include the user consent update, at least in some embodiments.

At 1014, the AMF may perform PDU update messaging with an SMF. The AMF may send various information to the SMF, including various information as defined by clause 4.3.3.2 of 3GPP TS 23.502. In addition, the PDU update message may include the user consent update, at least in some embodiments.

At 1016, the SMF may perform an N4 modification procedure with a UPF, such as UPF 608.

Further, the UE may acknowledge the PDU Session Modification Command by sending a PDU modification acknowledgement message 1018 to the RAN. The PDU modification acknowledgement message 1018 may be a NAS message that may include the user consent update, among other information.

The RAN may forward the PDU modification acknowledgement message to the AMF via an N2 NAS update message 1020. The N2 NAS update message 1020 may include the user consent update, among other information.

At 1022, the AMF may forward the user consent update to the SMF. The user consent update may be included in an N1 SM container which may also include User Location Information received from the RAN.

At 1024, the AMF may perform an N4 modification procedure with a UPF, such as UPF 608, e.g., to update user consent with the UPF.

Figure 11:
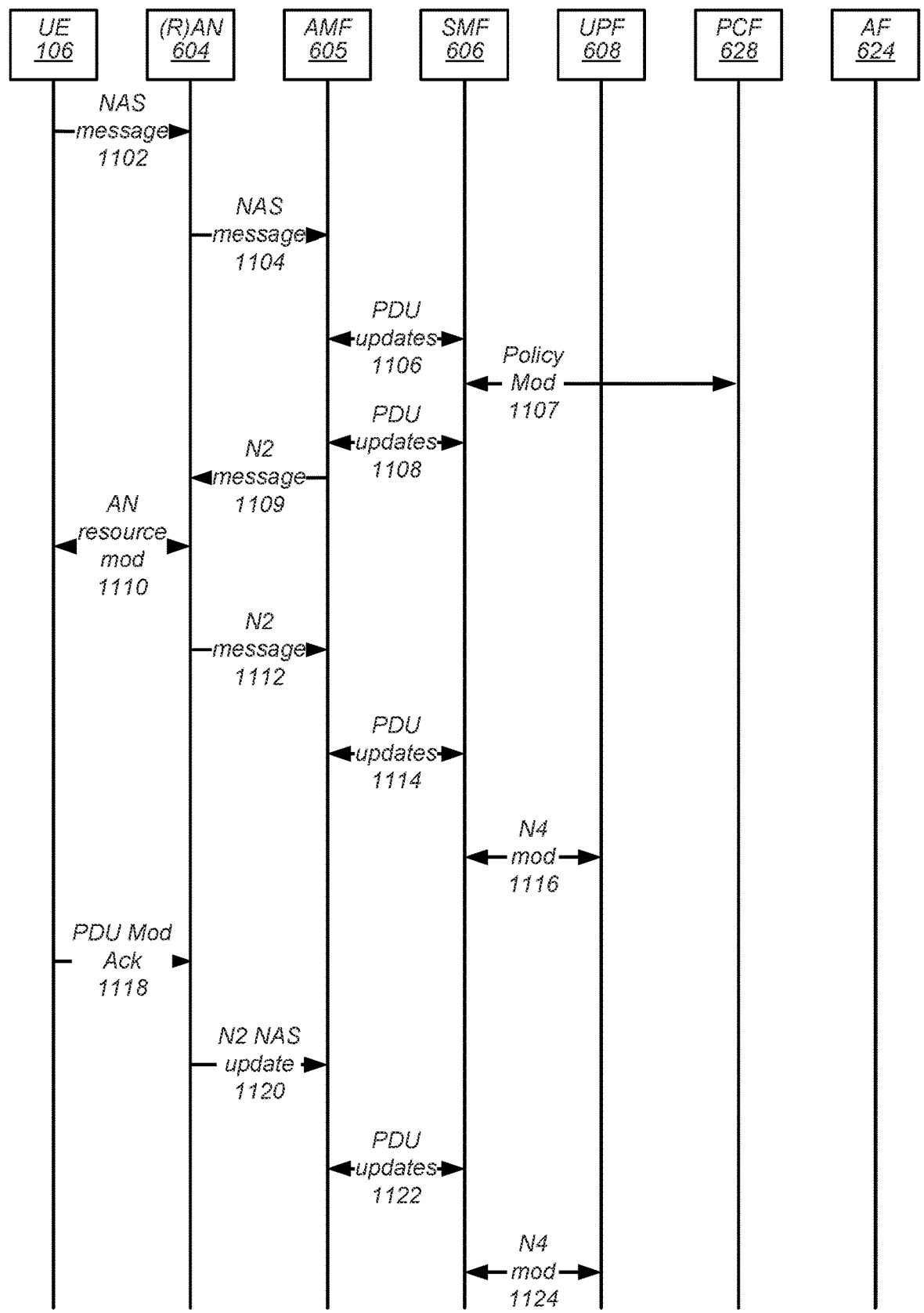
FIG. 11 illustrates an example of signaling for a UE to initiate a UE configuration update to trigger a user consent update procedure, according to some embodiments.

For example, FIG. 11 illustrates an example of signaling for a UE to initiate a UE configuration update to trigger a user consent update procedure, according to some embodiments. The signaling shown in FIG. 11 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1102, a UE, such as UE 106, may initiate a PDU Session Modification procedure by transmitting a NAS message to an access network (AN), such as radio AN ((R)AN) 604, which may include sending the NAS message to a base station, such as base station 604. The NAS message may include various information as defined by clause 4.3.3.2 of 3GPP TS 23.502. In addition, the NAS message may include a user consent update request.

At 1104, the AN may forward the NAS message to an AMF, such as AMF 605. The NAS message may include various information as defined by clause 4.3.3.2 of 3GPP TS 23.502. In addition, the NAS message may include a user consent update request. In some embodiments, the NAS message may be forwarded to the AMF with an indication of user location information.

At 1106, the SMF may perform PDU update messaging with an AMF, such as AMF 605. For example, the SMF may receive various information from the AMF, e.g., as currently defined by clause 4.3.3.2 of 3GPP TS 23.502. In addition, as part of the service, the SMF may receive a user consent update request from the AMF.

At 1107, the SMF may report some subscribed event to a PCF, such as PCF 628 by performing an SMF initiated SM Policy Association Modification procedure.

At 1108, for the UE (and/or) AN initiated modification, the SMF may respond to the AMF through a PDU response, e.g., such as Nsmf_PDUSession_UpdateSMContext Response. The response may include a user consent update acknowledge.

The AMF may then send an N2 message 1109 to a radio access network (RAN), such as (R)AN 604, which may include sending the N2 message to a base station, such as base station 604. The message may include the user consent update request as well as information as defined by clause 4.3.3.2 of 3GPP TS 23.502.

At 1110, the RAN may issue an access network (AN) specific signaling exchange with the UE that is related with the information received from SMF. For example, RRC Connection Reconfiguration may take place. Additionally, the UE may update user consent.

Additionally, the RAN may send an N2 reply message 1112 to the AMF, which may include various information as defined by clause 4.3.3.2 of 3GPP TS 23.502. The N2 reply message may include the user consent update, at least in some embodiments.

At 1114, the AMF may perform PDU update messaging with an SMF. The AMF may send various information to the SMF, including various information as defined by clause 4.3.3.2 of 3GPP TS 23.502. In addition, the PDU update message may include the user consent update, at least in some embodiments.

At 1116, the SMF may perform an N4 modification procedure with a UPF, such as UPF 608.

Further, the UE may acknowledge the PDU Session Modification procedure by sending a PDU modification acknowledgement message 1118 to the RAN. The PDU modification acknowledgement message 1118 may be a NAS message that may include the user consent update, among other information.

The RAN may forward the PDU modification acknowledgement message to the AMF via an N2 NAS update message 1120. The N2 NAS update message 1120 may include the user consent update, among other information.

At 1122, the AMF may forward the user consent update to the SMF. The user consent update may be included in an N1 SM container which may also include User Location Information received from the RAN.

At 1124, the AMF may perform an N4 modification procedure with a UPF, such as UPF 608, e.g., to update user consent with the UPF.

FIGS. 12A, 12B, 12C, 13, 14, and 15 illustrate examples of various methods for user consent modification, according to some embodiments. The method shown in these Figures may be used in conjunction with any of the systems, methods, or devices shown in the Figures, among other devices. In various embodiments, some of the method elements shown may be performed concurrently, in a different order than shown, or may be omitted. Additional method elements may also be performed as desired.

Figure 12A:
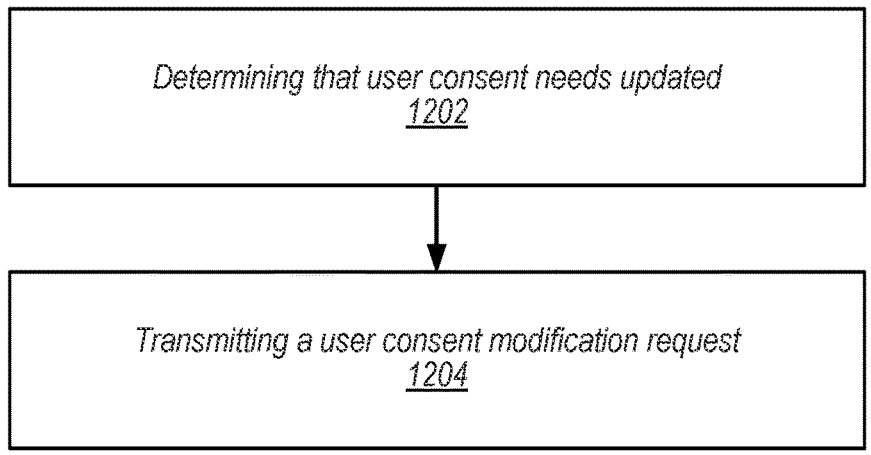
FIG. 12A illustrates an example of a method for user consent modification initiated by a UE, according to some embodiments.

Turning to FIG. 12A, FIG. 12A illustrates an example of a method for user consent modification initiated by a UE, according to some embodiments. The method shown in FIG. 12A may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a user equipment device (UE), such as UE 106, may determine that user consent needs to be updated. The determination may be based on various factors, such as an indicated change in user preference, a periodic update of user preference, and/or various other factors. The user consent may be associated with Edge Computing (MEC).

At 1204, the UE may transmit, via an application layer of the UE, a user consent modification request to an edge application server, such as EAS 834 of a network, e.g., of an edge data network such as EDGE network 832. The user consent modification request may be carried in application data traffic. In some embodiments, the user consent modification request may be indicated via an Nnef_Parameter-Provision_Update service operation. In some embodiments, the user consent modification request is indicated via an Nnef_ParameterProvision_Update service operation. In some embodiments, the user consent modification is a revocation of user consent. In some embodiments, the edge application server may deliver the request to an edge enabler server.

In some embodiments, the UE may receive from the edge enabler server, an acknowledgment of user consent update. The acknowledgement may be received via an EDGE-4 interface with the edge enabler server.

Figure 12B:
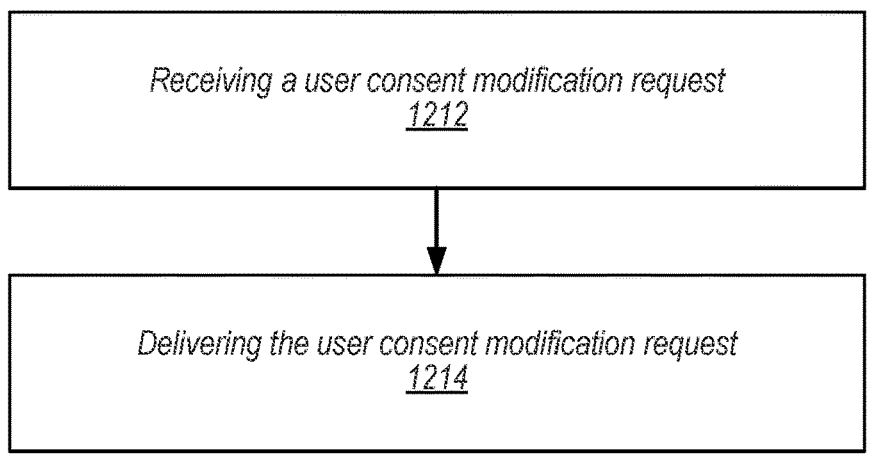
FIG. 12B illustrates an example of another method for user consent modification initiated by a UE, according to some embodiments.

Turning to FIG. 12B, FIG. 12B illustrates an example of another method for user consent modification initiated by a UE, according to some embodiments. The method shown in FIG. 12B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1212, an edge application server (EAS), such as EAS 834, may receive, from a UE, such as UE 106, a user consent modification request. The user consent modification request may be associated with Edge Computing (MEC). The user consent modification request may be carried in application data traffic. In some embodiments, the user consent modification may be a revocation of user consent.

At 1214, the EAS may deliver (e.g., send and/or transmit), to an edge enabler server (EES), such as EES 844, the user consent modification request. The user consent modification request may be indicated via an Nnef_ParameterProvision_Update service operation. In addition, the request may be delivered via an EDGE-3 interface with the edge enabler server.

Figure 12C:
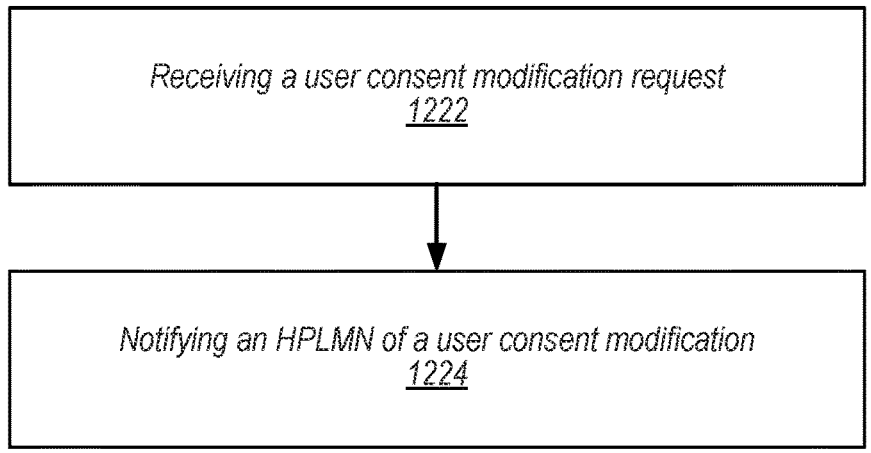
FIG. 12C illustrates an example of yet another method for user consent modification initiated by a UE, according to some embodiments.

Turning to FIG. 12C, FIG. 12C illustrates an example of yet another method for user consent modification initiated by a UE, according to some embodiments. The method shown in FIG. 12C may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1222, an edge enabler server (EES), such as EES 844, may receive, from an edge application server, such as EAS 834, a user consent modification request for a UE, such as UE 106. The user consent may be associated with Edge Computing (MEC). In addition, the user consent modification request may be received by the EAS in application data traffic. The user consent modification may be a revocation of user consent.

At 1224, the EES may notify a home public land mobile network (HPLMN) associated with the UE of a user consent modification. In some embodiments, the HPLMN associated with the UE may be notified via an EDGE-2 interface.

In some embodiments, the EES may deliver (e.g., send and/or transmit) the request to an edge configuration server (ECS), such as ECS 854. The request may be delivered via an EDGE-6 interface with the edge configuration server.

Figure 13:
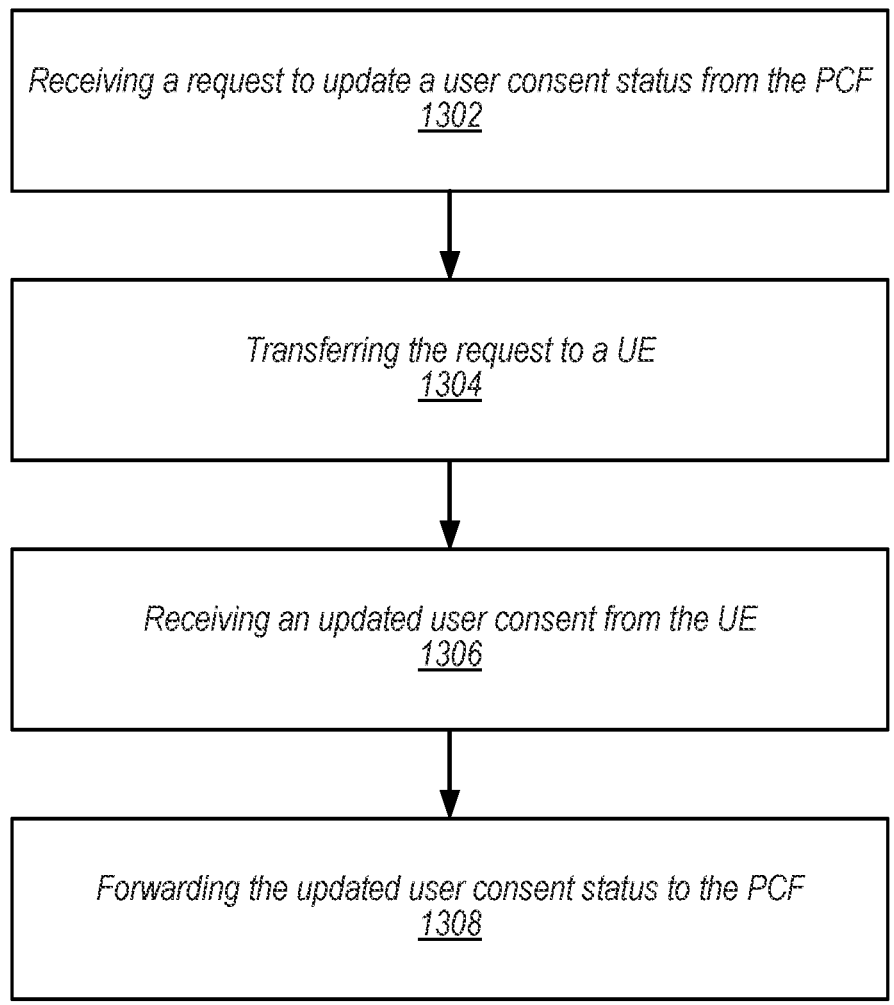
FIG. 13 illustrates an example of a method for user consent modification initiated by an AMF, according to some embodiments.

Turning to FIG. 13, FIG. 13 illustrates an example of a method for user consent modification initiated by an AMF, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, an AMF, such as AMF 605, of a network may receive, from a PCF, such as PCF 628, of the network, a request to update a user consent status. In some embodiments, the request to update the user consent status may be based, at least in part, on any, any combination of, and/or all of (e.g., one or more of and/or at least one of) an initial registration, a registration with a Fifth Generation System (5GS) when the UE moves from an evolved packet core system (EPS) to the 5GS, and/or a requirement to update UE policy. In some embodiments, the user consent status may be associated with Edge Computing (MEC).

At 1304, the AMF may transfer, to a UE, such as UE 106, the request to update the user consent status. In some embodiments, the UE may be in a CM-CONNECTED state over one of 3GPP access (e.g., cellular access) or non-3GPP access (e.g., non-cellular access).

At 1306, the AMF may receive, from the UE, an updated user consent status. In some embodiments, the updated user consent status may be indicated by Namf_Communication_N1MessageNotify. In some embodiments, the updated user consent status may indication revocation of user consent.

At 1308, the AMF may forward, to the PCF, the updated user consent status.

Figure 14:
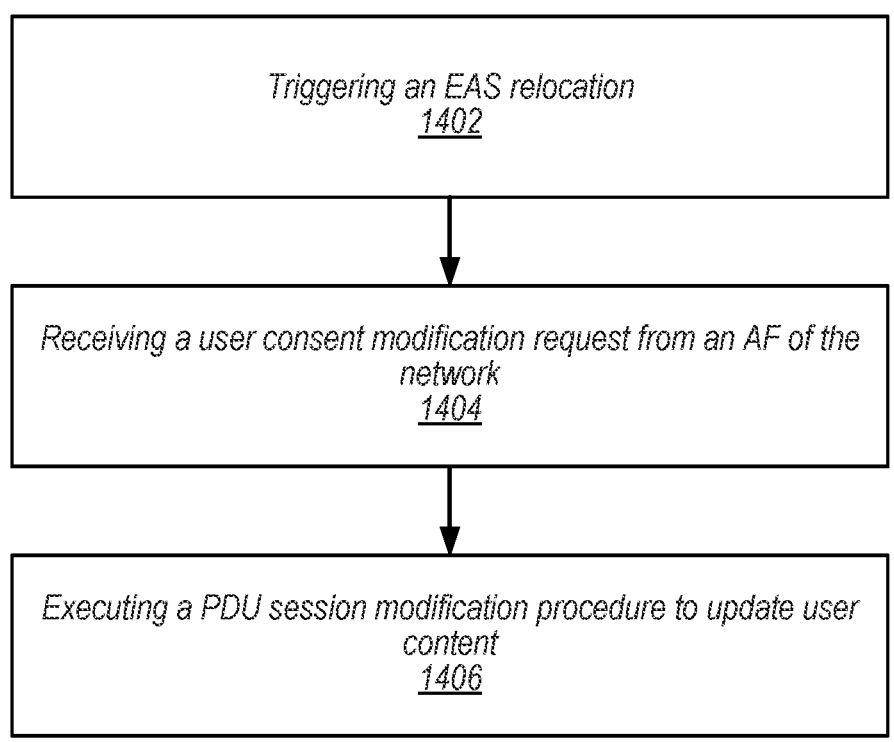
FIG. 14 illustrates an example of a method for user consent modification initiated by an SMF, according to some embodiments.

Turning to FIG. 14, FIG. 14 illustrates an example of a method for user consent modification initiated by an SMF, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, an SMF, such as SMF 606, of a network may trigger (e.g., initiate) an EAS relocation.

At 1404, the SMF may receive, from an AF, such as AF 624, of the network, a user consent modification request. In some embodiments, the user consent modification request may be a request to revoke user consent.

At 1406, the SMF may execute (e.g., perform) a PDU session modification procedure to update user consent. In some embodiments, a PDU session modification command sent by the SMF as part of the PDU session modification procedure may include a user consent update request field. In some embodiments, a PDU session modification command sent by the SMF as part of the PDU session modification procedure may include an impact field. The impact field may identify one or more EASs to be rediscovered. In some embodiments, a PDU session modification command sent by the SMF as part of the PDU session modification procedure may indicate all EASs are to be rediscovered. In some embodiments, a PDU session modification command sent by the SMF as part of the PDU session modification procedure may include an EAS rediscovery indication field and impact field and, if and/or when the EAS rediscovery indication field and impact field are set to same value, EAS rediscovery may be a user consent update only. In some embodiments, a PDU session modification command sent by the SMF as part of the PDU session modification procedure may include an EAS rediscovery indication field and impact field and, if and/or when the EAS rediscovery indication field and impact field are set to a fixed value, EAS rediscovery may be a user consent update only. In some embodiments, the fixed value may be 0.

Figure 15:
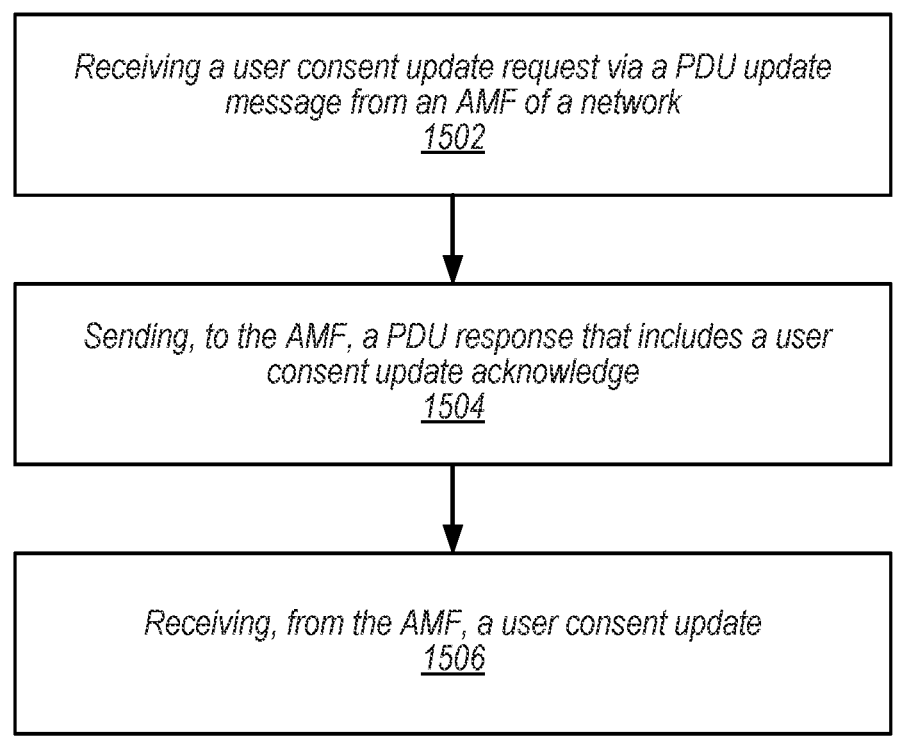
FIG. 15 illustrates an example of another method for user consent modification initiated by an SMF, according to some embodiments.

Turning to FIG. 15, FIG. 15 illustrates an example of another method for user consent modification initiated by an SMF, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, an SMF, such as SMF 606, of a network may receive, from an AMF, such as AMF 605, of the network, a user consent update request via a PDU update message. In some embodiments, the user consent update request may be triggered by a UE, such as UE 106, associated with the user consent.

At 1504, the SMF may send, to the AMF, a PDU response that may include a user consent update acknowledge. The PDU response may be a Nsmf_PDUSession_UpdateSM-Context response.

At 1506, the SMF may receive, from the AMF, a user consent update. In some embodiments, the user consent update may be a revocation of user consent. The user consent update may be received via an N1 SM container. In some embodiments, user location information may be received with the user consent update.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform communications;
   wherein the one or more processors are configured to cause the UE to:
   determine that user consent needs to be updated; and
   transmit, via an application layer of the UE, a user consent modification request carried in application data traffic to an edge application server.

2. The UE of claim 1,
   wherein the user consent is associated with Edge Computing (MEC).

3. The UE of claim 1,
   wherein the edge application server delivers the user consent modification request to an edge enabler server.

4. The UE of claim 3,
   wherein the one or more processors are further configured to receive, from the edge enabler server, an acknowledgment of user consent update.

5. The UE of claim 4,
   wherein the acknowledgement is received via an EDGE-4 interface with the edge enabler server.

6. The UE of claim 1,
   wherein the user consent modification is a revocation of user consent.

7. The UE of claim 1,
   wherein the user consent modification request is indicated via an Nnef_ParameterProvision_Update service operation.

8. A processor, comprising:
   a memory; and
   processing circuitry in communication with the memory and configured to:
   determine that user consent needs to be updated; and
   transmit, via an application layer, a user consent modification request carried in application data traffic to an edge application server.

9. The processor of claim 8,
   wherein the user consent is associated with Edge Computing (MEC).

10. The processor of claim 8,
    wherein the edge application server delivers the user consent modification request to an edge enabler server.

11. The processor of claim 10,
    wherein the processing circuitry is further configured to receive, from the edge enabler server, an acknowledgment of user consent update.

12. The processor of claim 11,
    wherein the acknowledgement is received via an EDGE-4 interface with the edge enabler server.

13. The processor of claim 8,
    wherein the user consent modification is a revocation of user consent.

14. The processor of claim 8,
    wherein the user consent modification request is indicated via an Nnef_ParameterProvision_Update service operation.

15. A non-transitory computer readable memory medium comprising instructions executable by a processor to:
    determine that user consent needs to be updated; and
    transmit, via an application layer, a user consent modification request carried in application data traffic to an edge application server.

16. The non-transitory computer readable memory medium of claim 15,
   wherein the user consent is associated with Edge Computing (MEC).

17. The non-transitory computer readable memory medium of claim 15,
   wherein the edge application server delivers the user consent modification request to an edge enabler server, wherein the instructions are further executable by the processor to receive, from the edge enabler server, and an acknowledgment of user consent update.

18. The non-transitory computer readable memory medium of claim 17,
   wherein the acknowledgement is received via an EDGE-4 interface with the edge enabler server.

19. The non-transitory computer readable memory medium of claim 15,
   wherein the user consent modification is a revocation of user consent.

20. The non-transitory computer readable memory medium of claim 15,
   wherein the user consent modification request is indicated via an Nnef_ParameterProvision_Update service operation.

* * * * *